United States Patent [19]

Moddemeijér

[11] 4,357,081
[45] Nov. 2, 1982

[54] PROJECTOR FOR THE PROJECTION OF A PANORAMIC IMAGE AND CAMERA FOR THE MANUFACTURE OF FILMS FOR A PROJECTOR OF THIS KIND

[75] Inventor: Kees Moddemeijér, Delft, Netherlands

[73] Assignee: Nederlandse Centrale Organisatie voor Toegepast-Natuurwetenschappelijk Onderzoek, The Hague, Netherlands

[21] Appl. No.: 116,451

[22] Filed: Jan. 29, 1980

[30] Foreign Application Priority Data

Feb. 2, 1979 [NL] Netherlands ............... 7900865

[51] Int. Cl.³ ............................................. G03B 37/00
[52] U.S. Cl. ....................................... 352/69; 352/115
[58] Field of Search ................. 352/69, 114, 115, 117; 354/94, 96, 99

[56] References Cited

U.S. PATENT DOCUMENTS

| | | | |
|---|---|---|---|
| 2,392,440 | 1/1946 | Waller et al. | 352/69 |
| 2,413,269 | 12/1946 | Waller et al. | 352/69 |
| 3,107,577 | 10/1963 | Adams | 352/70 |
| 4,078,860 | 3/1978 | Globus et al. | 352/69 |
| 4,185,898 | 1/1980 | Seitz | 352/69 |

FOREIGN PATENT DOCUMENTS

| | | | |
|---|---|---|---|
| 21862 | 1/1936 | Australia | 352/117 |
| 137087 | 10/1901 | Fed. Rep. of Germany | . |
| 384470 | 11/1923 | Fed. Rep. of Germany | . |
| 601835 | 7/1978 | Switzerland | . |

*Primary Examiner*—Munroe H. Hayes
*Attorney, Agent, or Firm*—Brumbaugh, Graves, Donohue & Raymond

[57] ABSTRACT

A motion picture projector, camera, and film for a panoramic motion picture. The projector advances a film strip along a cylindrical path for the projection of a panoramic image. Substantially identical condenser lenses with light sources are mounted inside the cylindrical film path aligned with and connected to projection lenses outside the cylindrical path. The condensers and projection lenses are rotated together at a speed other than the speed of movement of the film. The ratio of the angular velocity of the film to the angular velocity of the projection lenses is $n:(n-1)$, where n is the number of projection lenses. Each projection lens projects a section of the film that has a length of $360°/(n(n-1))$. The film strip has n series of portions representing n sectors of the panoramic scene, the time sequential portions of one series having $n-1$ intervening portions of other series therebetween. A camera for producing the film is similar in layout to the projector. The camera moves film and objective lenses with shutters and diaphragms at an angular velocity ratio of $n:(n-1)$.

11 Claims, 8 Drawing Figures

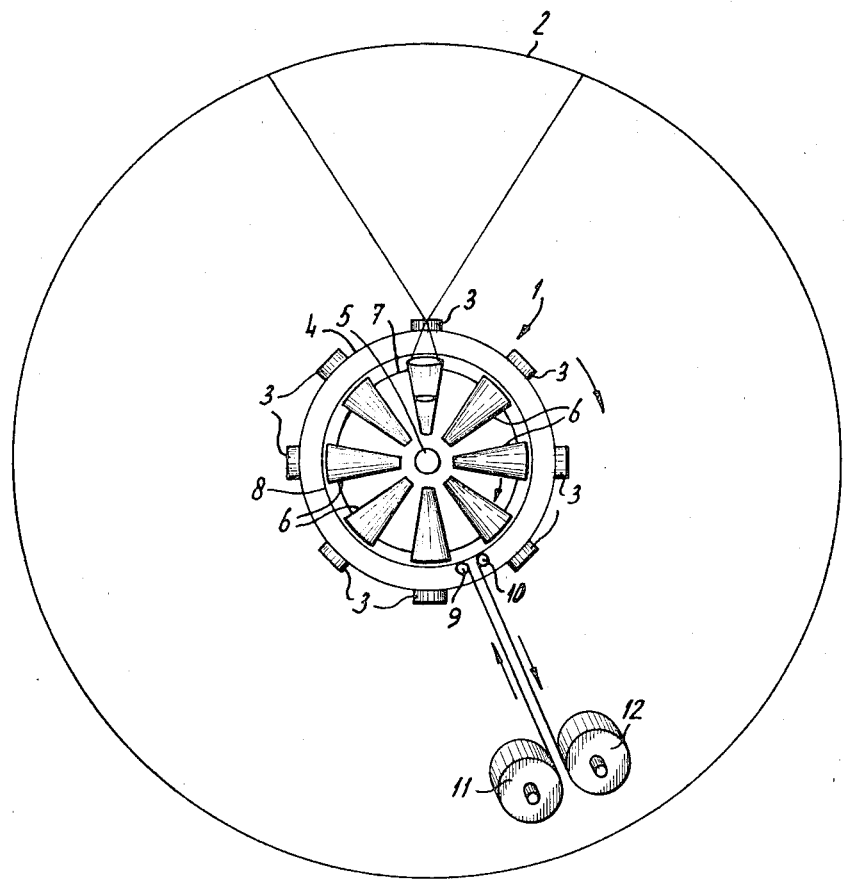

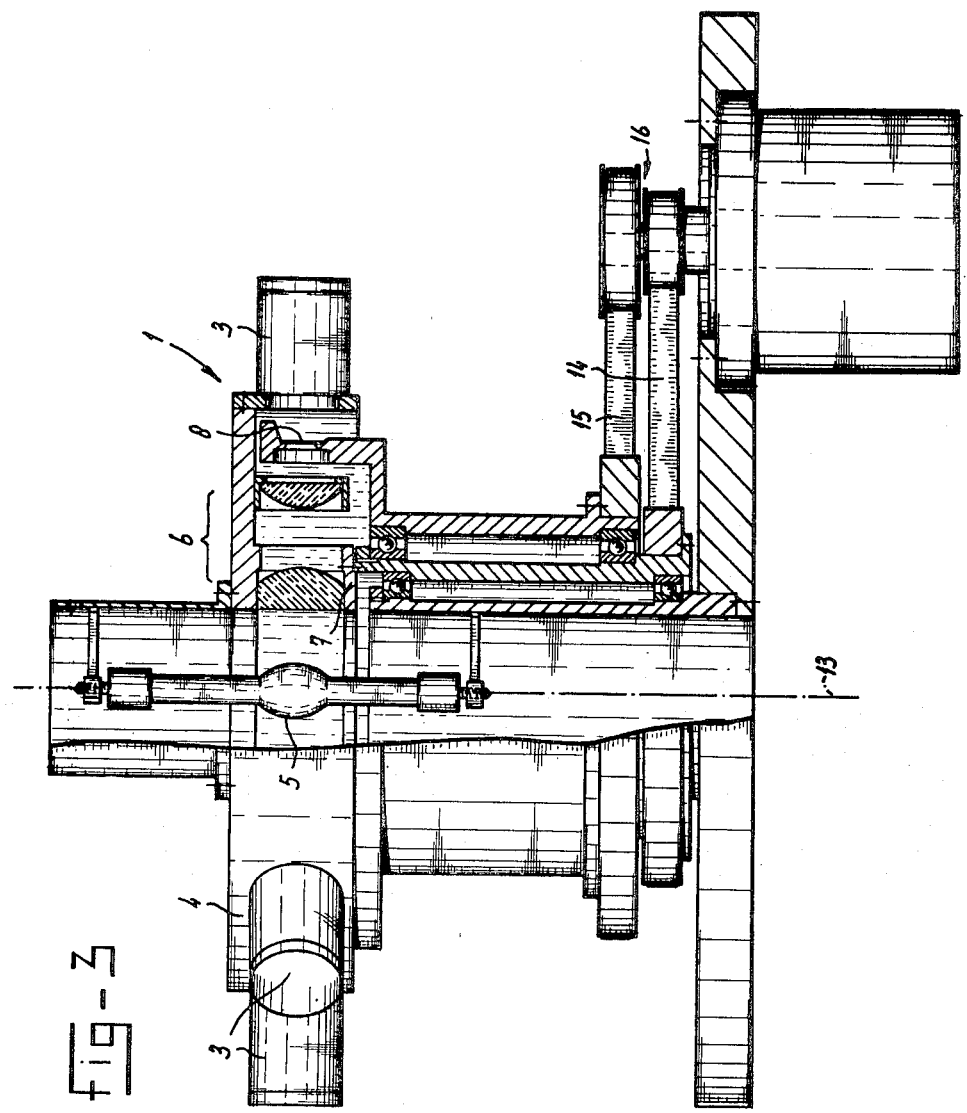

PROJECTOR FOR THE PROJECTION OF A PANORAMIC IMAGE AND CAMERA FOR THE MANUFACTURE OF FILMS FOR A PROJECTOR OF THIS KIND

BACKGROUND OF THE INVENTION

The invention relates to a projector for the projection of a panoramic image through an angle of 360°, said projector comprising means for supporting a transparent film with a picture to be projected in such a way that part of the film takes on the shape of a cylindrical surface, a number of substantially identical condensers with light source, said condensers being mounted inside the cylindrical surface and symmetrically with respect to the axis of said surface, said condensers being aligned and connected with the same number of substantially identical projection lenses, said lenses being mounted outside the cylindrical surface and also symmetrically with respect to the axis of the cylindrical surface, and means for rotating the condensers together with the projection lenses about the axis of the cylindrical surface.

A projector of this kind is known from German patent specification No. 384,470. In accordance with said patent specification, a transparency with the picture to be projected is bent into a cylindrical surfaceand coaxially disposed with a projection screen placed outside the transparency. One or more projection lenses, mounted outside the transparency and symmetrically with respect to the common axis of both cylindrical surfaces, may rotate about said axis together with the same number of condensers with light source aligned with said projection lenses and disposed inside the transparency. When the projection lenses and the appertaining condensers are being rotated, one section of the transparency is projected on the cylindrical projection screen with each rotation. When the rotational speed is high enough, i.e. each area of the projection screen is illuminated at least approximately 50 times per second, the eye will gain the impression that the entire transparency is projected permanently on the screen.

A disadvantage of the projector according to the cited German patent specification No. 384,470 is that a stationary transparency is projected and that, consequently, only a stationary image can be obtained.

BRIEF SUMMARY OF THE INVENTION

It is the object of this invention to provide a projector which does not show the above-mentioned disadvantage and with which moving images can be projected. Said object is achieved with a projector mentioned in the preamble; in accordance with the invention, said projector is characterized in that means are provided for the supply and removal of the film and for advancing the film along said cylindrical surface and that the means for rotating the condensers with the projection lenses and the means for transporting the film are connected in such a way that the ratio of the angular velocity of the film to the angular velocity of the projection lenses is n:(n−1), wherein n is the number of projection lenses.

The projection lenses are mounted in such a way that each projects a section of the film which has a length of 360°/(n(n−1)). The entire projection screen will then be illuminated by the n images projected.

Each condenser may have been provided with its own light source, however, the central disposal of only one light source in the axis of the cylindrical surface is preferred. Said light source should be rotation-symmetrical.

The invention will now be explained more in detail with reference to some embodiments illustrated in the drawing, wherein:

BRIEF DESCRIPTION OF THE DRAWINGS

FIG. 1 is a diagrammatic top view of a projector according to the invention, comprising eight projection lenses;

FIG. 3 is a section of a projector according to the invention along a plane passing through the axis of rotation;

DESCRIPTION OF PREFERRED EMBODIMENTS

Figure 2A:
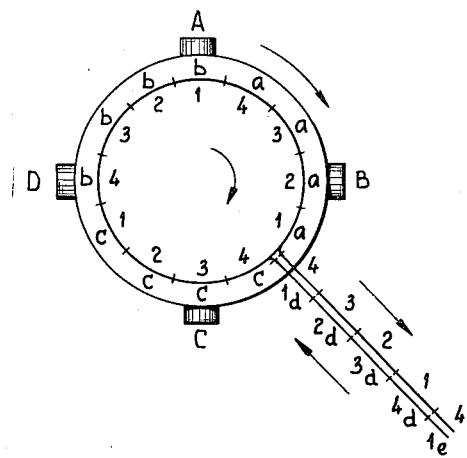
FIGS. 2a-d illustrate the change of position of the projection lenses and of the film during the projection.

In FIG. 1 the projector according to the invention is indicated by 1, said projector being mounted inside a cylindrical projection screen 2. The projector is provided with eight projection lenses 3 being secured to a circular body 4. A rotation symmetrical light source 5, e.g. a bulb, is disposed in the centre of the projector, i.e. in the axis of rotation and of symmetry. Eight condensers 6 are disposed around said light source 5, said condensers being connected to each other by a circular body 7. The circular bodies 4 and 7 are connected to each other and may rotate together about the axis of rotation which passes through the light source 5 (said axis of rotation being perpendicular to the plane of the paper). Each condenser 6 is aligned with a projection lens 3. A film 8 is disposed between the condensers 6 and the projection lenses 3, said film being supplied from a reel 11 via an obliquely mounted roller 9 and being taken up by a second reel 12 via another obliquely mounted roller 10. Between rollers 9 and 10 said film takes on the shape of a cylindrical surface of almost 360°. Rollers 9 and 10 are placed at an angle and the parts of the film between roller 9 and reel 11 and between roller 10 and reel 12 lie beyond the plane of the paper and they are more or less perpendicular thereto, so that the projection on screen 2 is not hindered. The projection lenses 3 and the condensers 6 are mounted in such a way that each lens projects a portion of the film 8 with an arc length of 360°/(n(n−1)) (wherein n is the number of projection lenses). In this case, each lens projects a section of the film with an arc length of 6°25 ′43 ″. On the screen, the image of such a film section covers an arc length of 360°/n, or, in this case 45°, so that the total of the projected images of all projection lenses fills the entire projection screen 2. The advantage is that even when the projector is stopped, a complete image is projected and is visible on the screen.

FIG. 2 is another top view, although more diagrammatic, of the projector illustrated in FIG. 1. FIG. 2 does not show eight projection lenses 3, but for the sake of simplicity only four, i.e. A, B, C and D.

At the bottom right-hand of FIG. 2 the film is supplied and removed. The film has e.g. a number of pictures a, b, c etc. of the four gable walls bounding a square. Each picture a, b, c etc. is divided into four parts 1, 2, 3 and 4 of the same size and each one of them is the picture of one of the four gable walls of the square. In FIG. 2a the picture b1 is opposite the lens A and, consequently, it is projected on the screen (not shown).

Figure 2B:
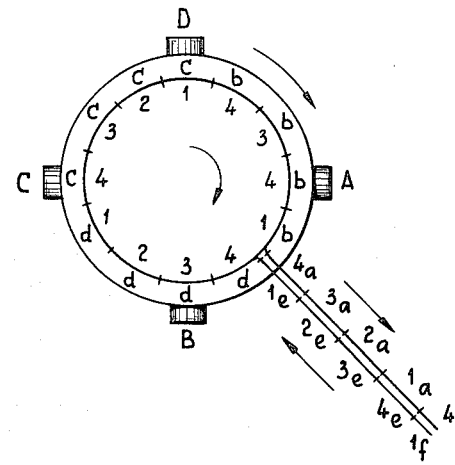

In FIG. 2b the projection lenses are rotated one quarter clockwise so that lens D is now at the place where lens A first was. Film picture c1 is opposite lens D: it is a picture of the same gable wall as b1, but taken a bit later. Picture c1 is opposite lens D, because the film is being transported in the same direction (clockwise) as the projection lens is being rotated, but slightly faster, so that the film has moved on one picture with respect to the projection lenses.

Figure 2C:
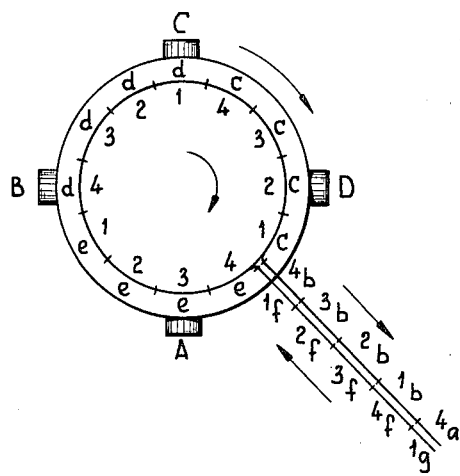

In FIG. 2c the four projection lenses have been turned again one quarter clockwise and the film has been advanced again through 90° plus the length of one picture. Picture d1 is now opposite lens C which is now at the place where lens A was in FIG. 2a, said picture being again an image of the same gable wall, but again at a slightly later stage than picture c1.

Figure 2D:
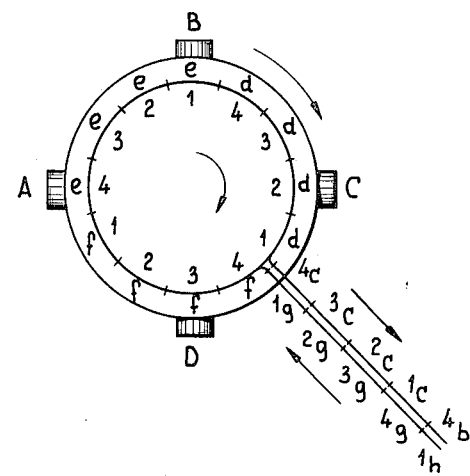

In FIG. 2d the projection lens B is at the place where lens A was in FIG. 2a and lens B projects picture e1, which, again, is an image of the same gable wall. By rotating the projection lenses and by advancing also the film (slightly faster but in the same direction), always the same gable wall is projected on a fixed area of the screen, however, each time at a later stage.

In FIG. 2a-2d the number (3) of the series of pictures a, b, c, etc. on the cylindrical portion of the film is one less than the number (4) of the projection lenses. Since there is always a picture with the same number in front of a projection lens, e.g. a1, b1, c1, etc. the rotation of the projection lenses through 360°/n corresponds with a movement of the film through 360°/(n−1). When comparing e.g. FIGS. 2a and 2b, it is noted that a rotation of the projection lenses through 90° (=360°/4) involves a movement of the film through an arc of 120° (=360°/3).

Consequently, the ratio of the angular velocity of the film to the angular velocity of the projection lenses is 4:3. More in general, it can be stated that when the number of projection lenses is n, the ratio of the angular velocity of the film to the angular velocity of the projection lenses is n:(n−1).

As all projection lenses as well as the film rotate, although the film slightly faster than the lenses, the projection of a film picture is stationary on the screen. Considering the effect of one rotating lens on the screen, the impression is gained that an image which is stationary on the screen is illuminated briefly by a beam of light sweeping over it.

FIG. 3 is a section of the projector according to the invention taken along a plane passing through the axis 13 of rotation and of symmetry. A light source 5 has been provided in the axis 13, said source being rotation symmetrical with respect to the axis 13. Light rays from the light source 5 enter the first lens of a condenser 6; subsequently, they pass the second lens of said condenser and they will then pass through the film 8, whereupon they are projected onto the screen (not shown) by the lens 3.

The light source 5 is stationary; the condensers 6 and projection lenses 3 rotate together about the axis 13, but they do not move relative to each other. Film 8 rotates also about the axis 13, but at a slightly higher speed than the lenses and the condensers. The drive of the projection lenses, the condensers 14 and the drive of the film 15 are coupled by gear wheels 16 or sprocket-wheels and chains, as a result of which a constant ratio between the angular velocity of the projection lenses and the angular velocity of the film is guaranteed.

Generally, the quality of the image will improve, if the size of the projected image is limited in the direction in which the projection screen is curved. However, the disadvantage is that as the projected images become narrower, alternately exposed and unexposed areas will be formed on the screen, as a result of which the image seen by the eye will flicker. However, at a sufficiently high frequency (approximately 50 per second) of alternate exposure and unexposure the flicker effect will disappear. If demands are made that the entire screen is exposed to light continuously, which has the advantage that the speed of rotation of the projector may be lower and that even in the case of a stationary projector a coherent image (stationary, of course) is observed, the reducing of the width of the images projected should be accompanied by an increase of the number (n) of projection lenses.

It needs hardly any argument that by the provision of a cylindrical mask around part of the projector, one part of the projections can be masked off and the projector can then be used for projections on e.g. a semi-circular, wide screen.

Figure 4:
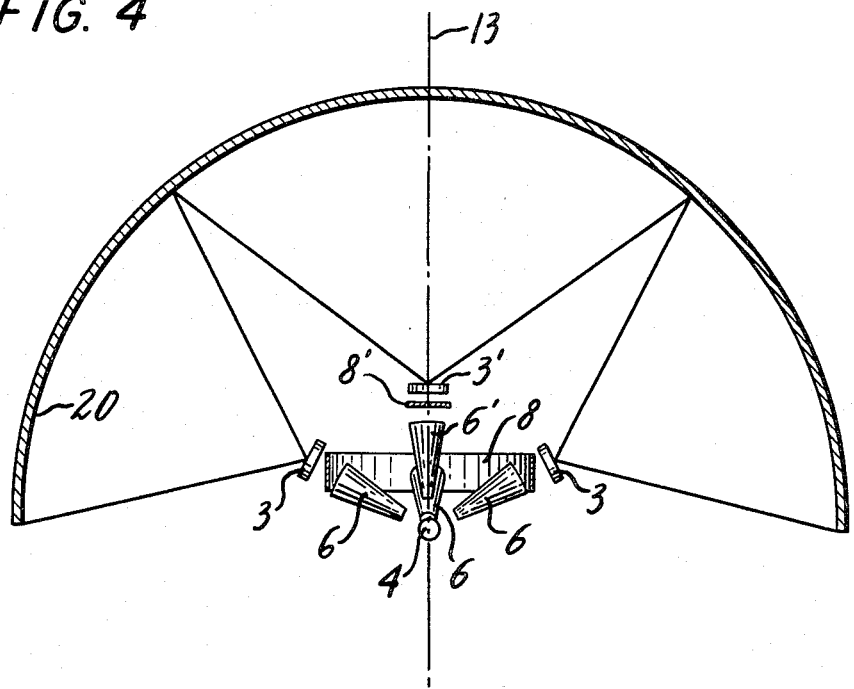
FIG. 4 is a diagrammatic cross-sectional view of a projector and hemispherical screen forming a planetarium.

It is also possible as in FIG. 4 to use the projector with a hemispherical screen 20 instead of a cylindrical one. When, in addition, all projection lenses 3 are inclined slightly upwards, the projector and the hemispherical projection screen can be used as a planetarium. However, it is recommended that an additional projection lens 3 with an extra film 8 be mounted on the head of the projector, said projection lens being directed upwards along the axis of rotation 13 and, thus, projecting a picture around the zenith of the projection screen.

Figure 5:
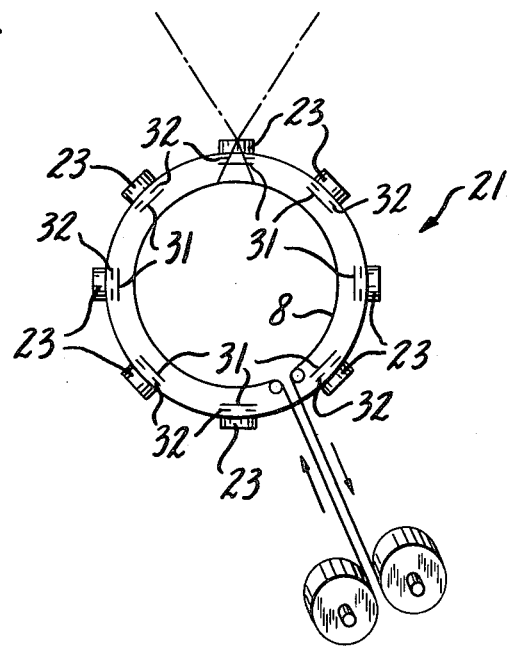
FIG. 5 is a diagrammatic top view of a camera according to the invention, comprising eight objective lenses associated apertures and shutters.

As illustrated in FIG. 5, a panoramic film 8 which can be used for projection in the projector according to the invention, can be manufactured with the aid of a camera 21 which resembles the projector. E.g. when one wants to use a projector with eight projection lenses, the pictures should be taken with a camera with eight objectives 23, which are mounted in the same way as the lenses in the projector. Even the film should run through the camera in the same way as the film in the projector and the ratio of the angular velocity of the film to the angular velocity of the objectives should be the same as, in the case of the projector, the ratio of the angular velocity of the film to the angular velocity of the projection lenses. However, in the case of a camera the light source(s) and the condensers will be omitted and the objectives will have to be provided with shutters 31, diaphragms 32, etc.

I claim:

1. Projector for the projection of a panoramic image through an angle of substantially 360°, said projector comprising means for supporting a transparent film with a picture to be projected in such a way that part of the film takes on the shape of a cylindrical surface, a number of substantially identical condensers with a light source, said condensers being mounted inside the cylindrical surface and symmetrically with respect to the axis of said surface, said condensers being aligned and connected with the same number of substantially identical projection lenses, said lenses being mounted outside the cylindrical surface and also symmetrically with respect to the axis of the cylindrical surface, and means for rotating the condensers together with the projection lenses about the axis of the cylindrical surface, characterized in that means are provided for the supply and removal of the film and for advancing the film along said cylindrical surface, and that the means for rotating the condensers with the projection lenses and the means for transporting the film are connected in such a way that the ratio of the angular velocity of the film to the angular velocity of the projection lenses is n:(n−1), wherein n is the number of projection lenses.

2. Projector according to claim 1, characterized in that the projection lenses are mounted in such a way that each lens projects a section of the film with an arc length of substantially $360°/(n(n-1))$.

3. Projector according to claim 1 or 2, characterized in that all of the condensers receive their light from one light source disposed at the axis of the cylindrical surface and rotationally symmetrical about that axis.

4. Projector according to claim 1 or 2, characterized in that the means for the supply and removal of the film comprise two obliquely mounted rollers, one of which bends the film in the plane in which lies the projection lenses, said film being supplied substantially perpendicularly to said plane, and the other roller bends the film to be removed substantially perpendicularly out of said plane.

5. A projector according to claim 1 or 2 in a projection arrangement, characterized in that a projection screen is provided around the projector, said screen having substantially the shape of a cylindrical surface coaxial with the cylindrical surface constituted by the film, and the focal characteristics of the projection lenses and the distance between the projector and the projection screen providing the focusing of a sharp image by each projection lens on the projection screen.

6. A projector according to claim 1 or 2 and centrally located with respect to a substantially hemispherical projection screen said projector being provided with an additional, stationary, projection lens directed upwards along the axis of rotation of the projector and having an associated condenser, light source and means for the supply and removal of a film.

7. The projector according to claim 1 for use with a film strip having time sequential portions representing a first sector of the panoramic image separated by at least one other intervening portion representing another sector of the image, said projector having drive means connected with the means for rotating and the means for transporting for moving each intervening portion of the strip past the location for projection of the first image sector while moving a succeeding lens to that position.

8. A motion picture camera for the manufacture of a film to be used in a panoramic projector, characterized in that said camera comprises means for the supply, removal and guidance along a cylindrical surface of a film strip for exposure, objectives with shutters and diaphragms disposed outside said cylindrical surface and symmetrically with respect to the axis of this surface, as well as means for rotating the objectives and the film about the axis of the cylindrical surface in such a way that the ratio of the angular velocity of the film to the angular velocity of the objectives is n:(n−1), wherein n is the number of objectives.

9. Camera according to claim 8, characterized in that each objective exposes a section of the film with a length of $360°(n(n-1))$.

10. Camera according to claim 8 or 9, characterized in that the means for the supply and removal comprise two obliquely mounted rollers, one of which bends film in the plane in which lies the projection lenses, said film being supplied substantially perpendicularly to said plane, and the other roller bends the film to be removed substantially perpendicularly out of said plane.

11. A motion picture film strip for use in a panoramic motion picture projector; the strip including a first series of first time sequential portions of film representing time sequential images of a first sector of the panoramic image, at least a second series of intervening portions of film with portions between sequential portions of the first series and representing another sector of the panoramic image, wherein, in combination, the portions of film from the several series represent an image of substantially 360°, said strip having n series of portions representing n sectors of the panoramic scene, the time sequential portions of one series having n−1 intervening portions of other series therebetween, whereby when projected by a projector with n objective lenses rotating at (n−1)/n times the angular velocity of the film moving on a generally cylindrical path in the projector said strip portrays all parts of the substantially 360° image time sequentially.

* * * * *

UNITED STATES PATENT AND TRADEMARK OFFICE
CERTIFICATE OF CORRECTION

PATENT NO. : 4,357,081
DATED : November 2, 1982
INVENTOR(S) : Kees Moddemeijer

It is certified that error appears in the above-identified patent and that said Letters Patent are hereby corrected as shown below:

In column 1, line 27, "surfaceand" should read --surface and--.

In column 4, line 34, "3" should read -- 3' --.

In column 4, line 34, "8" should read -- 8' --.

In column 5, line 15, "360°/(n(n-1)" should read --360°/(n(n-1))--.

In column 6, line 21, "360°(n(n-1))" should read --360°/(n(n-1))--.

Signed and Sealed this

Eighth Day of March 1983

[SEAL]

Attest:

Attesting Officer

GERALD J. MOSSINGHOFF
Commissioner of Patents and Trademarks